(12) United States Patent
Rasmussen

(10) Patent No.: US 9,400,085 B2
(45) Date of Patent: Jul. 26, 2016

(54) METHOD, SYSTEM, AND APPARATUS FOR FLOOD CONTROL

(71) Applicant: Jon Erik Rasmussen, Helena, AL (US)

(72) Inventor: Jon Erik Rasmussen, Helena, AL (US)

( * ) Notice: Subject to any disclaimer, the term of this patent is extended or adjusted under 35 U.S.C. 154(b) by 357 days.

(21) Appl. No.: 14/127,329

(22) PCT Filed: Dec. 6, 2013

(86) PCT No.: PCT/US2013/073671
§ 371 (c)(1),
(2) Date: Dec. 18, 2013

(87) PCT Pub. No.: WO2014/099425
PCT Pub. Date: Jun. 26, 2014

(65) Prior Publication Data
US 2014/0182727 A1 Jul. 3, 2014

Related U.S. Application Data

(60) Provisional application No. 61/739,555, filed on Dec. 19, 2012.

(51) Int. Cl.
*E02B 7/20* (2006.01)
*E02B 7/38* (2006.01)
*F17D 1/20* (2006.01)
*E02B 3/02* (2006.01)

(52) U.S. Cl.
CPC ...... *F17D 1/20* (2013.01); *E02B 3/02* (2013.01); *E02B 7/205* (2013.01); *E02B 7/38* (2013.01)

(58) Field of Classification Search
CPC ............... E02B 5/08; E02B 7/20; E02B 7/38; E02B 9/027
USPC .................................................. 405/87, 103
See application file for complete search history.

(56) References Cited

U.S. PATENT DOCUMENTS

| | | | | |
|---|---|---|---|---|
| 790,573 | A | * | 5/1905 | Hicks ............... E02B 13/00 405/104 |
| 1,158,165 | A | | 10/1915 | Blakely |
| 1,190,400 | A | | 7/1916 | Giele |
| 1,370,296 | A | * | 3/1921 | Edwards ........... E02B 13/00 405/106 |

(Continued)

FOREIGN PATENT DOCUMENTS

| | | |
|---|---|---|
| CN | 101012665 | 8/2007 |
| DE | 3133340 A1 | 3/1983 |

(Continued)

OTHER PUBLICATIONS

Vizirskaya, M. "International Search Report and Written Opinion—PCT application No. PCT/US2013/073671" Apr. 3, 2014; pp. 1-9, The Russian Federal Service for Intellectual Property.

*Primary Examiner* — Frederick L Lagman

(74) *Attorney, Agent, or Firm* — Nicholas J. Landau; Thomas G. Peterson; Bradley Arant Boult Cummings LLP

(57) ABSTRACT

A dynamic fluid flow control structure is provided that allows precise control over fluid flow using a series of two or more orifices, at least one of which may be reconfigured to change its flow characteristics. A flood control system and a flood control process are provided that emulate a preset discharge profile over time. Some versions of the structure, process, and system can be used to provide controlled storm discharge patterns in a developed area that emulate the natural pre-development discharge patterns.

19 Claims, 12 Drawing Sheets

(56) References Cited

U.S. PATENT DOCUMENTS

| | | | |
|---|---|---|---|
| 1,964,663 A | 6/1934 | Gossler | |
| 1,966,628 A | 7/1934 | Johnson | |
| 1,985,565 A | 12/1934 | Gard | |
| 2,625,798 A * | 1/1953 | Reed | E02B 7/205 405/106 |
| 2,642,723 A * | 6/1953 | Reismann | E02B 13/02 405/90 |
| 2,725,720 A * | 12/1955 | Lough | E02B 13/00 251/205 |
| 2,885,175 A * | 5/1959 | Irving | E02B 13/00 251/147 |
| 2,918,077 A | 12/1959 | Jack | |
| 3,141,649 A * | 7/1964 | Baxter | E02B 13/02 251/176 |
| 3,338,057 A * | 8/1967 | Eckstine | E02B 13/02 405/95 |
| 4,265,564 A * | 5/1981 | Watelet | E02B 7/54 405/105 |
| 4,300,858 A | 11/1981 | Zintz et al. | |
| 4,582,083 A | 4/1986 | Steinhardt | |
| 5,092,708 A * | 3/1992 | Kruger | E02B 7/38 405/103 |
| 5,342,144 A * | 8/1994 | McCarthy | E03F 1/00 405/36 |
| 6,010,115 A | 1/2000 | Schlegel et al. | |
| 6,715,508 B2 | 4/2004 | Schafer et al. | |
| 6,786,234 B2 | 9/2004 | Schafer et al. | |
| 7,186,058 B2 | 3/2007 | Schluter et al. | |
| 7,270,498 B1 * | 9/2007 | Albanese | E04B 1/7076 405/103 |
| 8,393,827 B1 * | 3/2013 | Happel | E03F 5/105 251/326 |
| 2003/0026658 A1 * | 2/2003 | Wu | E02B 7/30 405/87 |
| 2003/0222411 A1 * | 12/2003 | Simon | E02B 7/28 277/630 |
| 2005/0002737 A1 * | 1/2005 | Cullen | E02B 7/20 405/87 |
| 2007/0246113 A1 | 10/2007 | Raftis | |
| 2010/0254765 A1 * | 10/2010 | Gainey, Sr. | E02B 3/10 405/39 |

FOREIGN PATENT DOCUMENTS

| | | | |
|---|---|---|---|
| DE | 408247 A1 | 3/1990 | |
| FR | 2957946 | 9/2011 | |
| GB | 191116331 | 8/1911 | |
| JP | EP 2894259 A1 * | 7/2015 | E02B 7/38 |
| RU | 2360073 | 6/2009 | |
| WO | 00/36233 | 6/2000 | |

\* cited by examiner

METHOD, SYSTEM, AND APPARATUS FOR FLOOD CONTROL

CROSS-REFERENCE TO RELATED APPLICATIONS

This application is a national stage under 35 U.S.C. 371 of International Application PCT/US2013/73671, filed on Dec. 6, 2013 (currently pending). International Application PCT/US2013/73671 cites the priority of U.S. Patent Application 61/739,555, filed Dec. 19, 2012 (currently pending).

BACKGROUND

A. Field of the Disclosure

The present disclosure relates generally to flood control. More specifically, the disclosure relates to the control of the discharge of flood waters from a source body of water.

B. Background

Controlling the effects of flood events has long been an engineering challenge. The development of agricultural areas or wild areas inevitably changes the patterns of runoff into streams during rainfall events. During the course of development, permeable soil is covered with buildings and roads, which are impermeable to water. As a result, the flow of water that hits the ground as precipitation is not slowed by percolation into the ground. This causes runoff to enter rivers and streams at very high rates of volumetric discharge in developed areas. The attendant runoff problems can cause flooding of downstream areas, erosion, and non-point source pollution of rivers and streams.

The conventional approach to controlling runoff from precipitation events is to provide a static flood control structure. In the absence of flood control structures, runoff from a developed area will usually occur at an extremely high initial rate ("peak flow") and then decline abruptly. Static flood control structures, such as dams and weirs, reduce the peak flow rate and cause the flow to taper off slowly.

Static control structures typically consist of a fixed opening that is designed to restrict the discharge flow rate for a hypothetical design storm event. Of course, a design storm event will never occur. Design storms are based on statistical data compiled over the course of several years from weather stations and other sources. One commonly used process for developing the design storm events is described in a document published by the United States Department of Commerce prepared for the Natural Resources Conservation Service, often referred to as Technical Paper 40 (TP40), published May 1961. This document is widely used for controlling storm water runoff for post-developed watersheds.

Although static controls reduce the impacts of development significantly, they do not emulate the natural pre-development flow patterns in response to precipitation. The standard of practice in site development is to restrict the post-developed peak flow rate to pre-developed peak flow rate conditions for a hypothetical design storm event. This results in gradual decline in the recession limb of the hydrograph consequently resulting in higher discharge velocities and higher discharge flow rates over the duration of the storm event.

Natural flow patterns are more desirable than the types of less attenuated patterns that static control structures provide. In addition to reducing erosion, downstream flooding, and non-point source pollution, natural flow patterns serve to maintain waterlogged (hydric) soils that form and maintain wetlands. The wetlands in turn mitigate floods, remove pollutants, and spawn wildlife. Static control structures cannot emulate natural flow. The natural flow patterns from a given drainage area are the result of many complex interacting factors, such as heterogeneous soil porosity, the presence (or absence) of impermeable soil layers, and topography. Furthermore, natural flow patterns will vary with the severity of a precipitation event. Current control structure designs are generated from idealized "design storm events." Design storm events are created from hypothetical methods calculated from historical data. These data, being generated by mathematical models, may not reflect the variations of depth, intensity, and durations of actual precipitation events. Furthermore, the rate of discharge of static control structures is a direct function to the hydrostatic pressure (also known as "head," which is directly related to depth) in the detention body, making it impossible to replicate pre-developed hydrology.

Consequently there is a need in the art to provide natural flow patterns even after areas have been developed.

SUMMARY

A dynamic fluid flow control structure 1 is provided which provides incremental flow control (as opposed to continuous flow control). In a general embodiment, the fluid flow control structure 1 comprises: a conduit 100 through which the fluid flows; an upstream reconfigurable barrier 200 in the conduit 100, the upstream barrier 200 comprising an upstream orifice 210, and the upstream barrier 200 capable of assuming a first upstream configuration and a second upstream configuration; a downstream barrier 300 in the conduit 100, the downstream barrier 300 comprising a downstream orifice 310; wherein the upstream orifice 210 restricts the flow of the fluid more than does the downstream orifice 310 when the upstream barrier 200 assumes the first configuration, and wherein the upstream orifice 210 restricts the flow of the fluid no more than does the downstream orifice 310 when the upstream barrier 200 assumes the second configuration.

Another general embodiment the fluid flow control structure 1 comprises a means for providing a first orifice 600 in the path of the fluid flow; a means for providing a second orifice 700 orifice larger than the first orifice in the path of the fluid flow downstream from the first orifice; and a structure selected from the group consisting of: (i) a means for expanding the first orifice 800 to a size greater than the size of the second orifice; and (ii) a means for removing the first orifice 900 from the path of the fluid flow.

A method of controlling fluid flow through a conduit 100 is provided, wherein the conduit 100 comprises an upstream orifice 210 and a downstream orifice 310, the method comprising: reconfiguring the upstream orifice 210 from a configuration in which the upstream orifice 210 reduces the flow of the fluid more than does the downstream orifice 310 to a configuration in which the upstream orifice 210 reduces the flow of the fluid no more than does the downstream orifice 310.

A flood control system 3000 is provided. A general embodiment of the flood control system 3000 comprises means for variably controlling the rate of volumetric discharge 1600 from an intake point to a release point; means for automated control 1700 of the means for variably controlling the rate of volumetric discharge 1600; means for measuring the water level 1800 at the intake point that transmits water level data to the means for automated control 1700; means for measuring rainfall 1900 that transmits rainfall data to the means for automated control 1700; and means for storing a storm discharge function 1410 that is readable by the means for automated control 1700.

Another general embodiment of the flood control system 3000 comprises a flow control structure 1000 configured to variably control the rate of volumetric discharge from an intake point to a release point; a computing device 1100 in control of the flow control structure 1000; a water level meter 1200 positioned to measure the water level at the intake point and configured to transmit water level data to the computing device 1100; a rain gauge 1300 configured to transmit rainfall data to the computing device 1100; and a machine-readable data storage device 1400 comprising a storm discharge function 1410, wherein the machine-readable data storage device 1400 is configured to be read by the computing device 1100.

A process for controlling discharge from a body of water during a storm event is provided, the process comprising: reading a storm discharge function 1410 from a machine-readable storage device, wherein the storm discharge function 1410 sets a rate of volumetric discharge as a function of rainfall rate; computing a target rate of volumetric discharge by plugging a rainfall rate value into the function; and configuring a flow control structure 1000 to provide approximately the target rate of volumetric discharge from the body of water. A machine-readable storage device is provided containing a program which when read by a computing device causes the computing device to perform this process.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
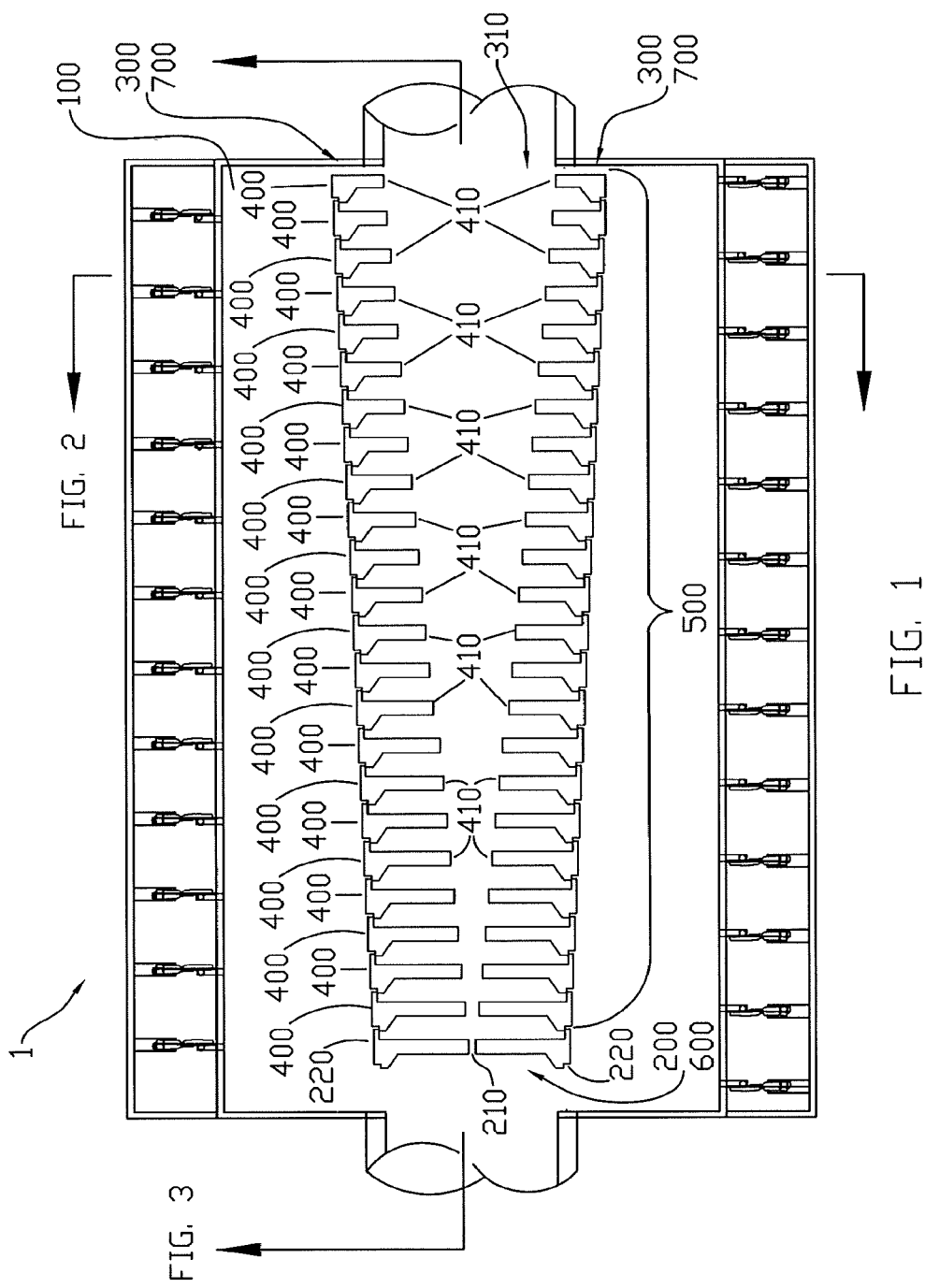
FIG. 1: A cross-sectional illustration of an embodiment of the dynamic flood control structure 1.
Figure 2:
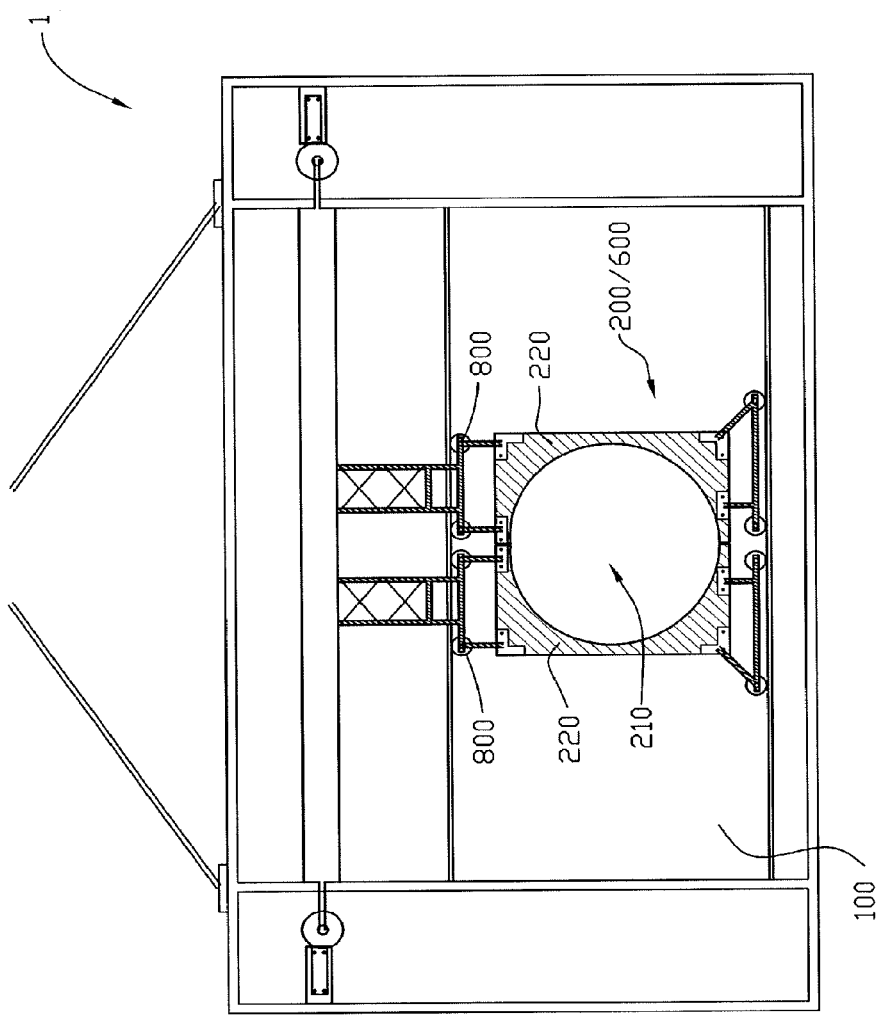
FIG. 2: An illustration of the longitudinal cross-section from FIG. 1 (labeled FIG. 2).
Figure 3:
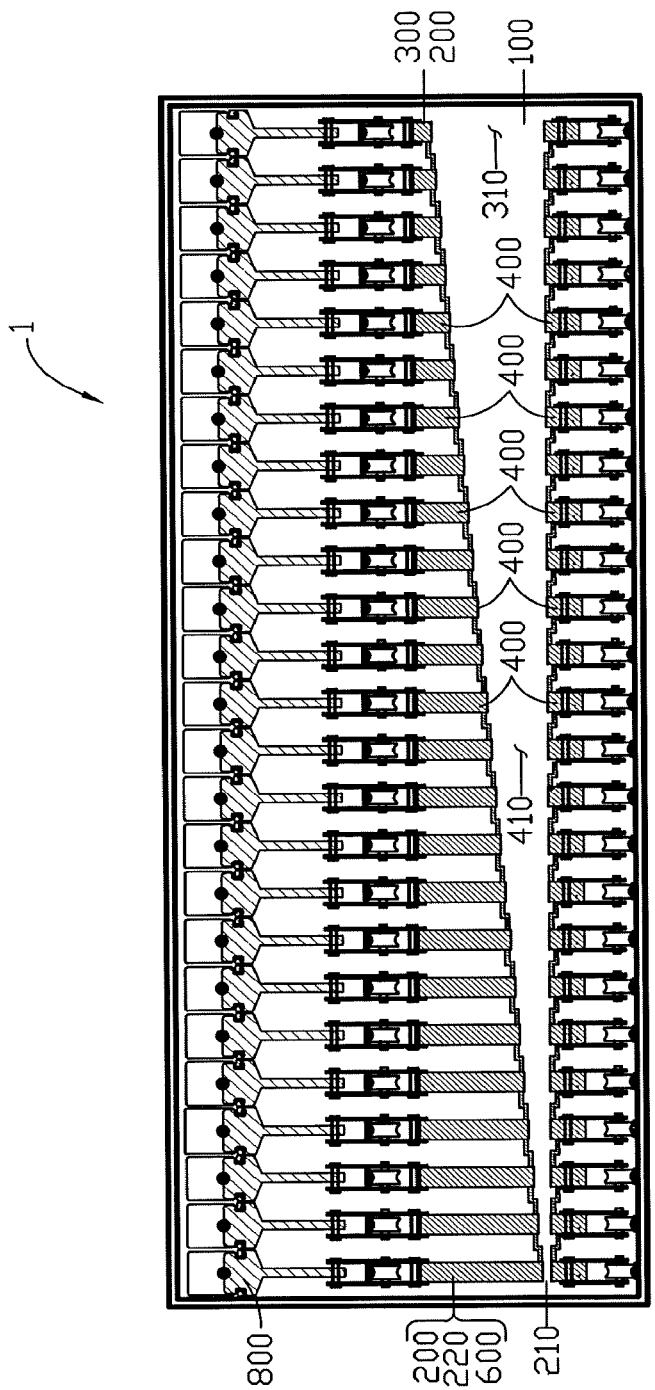
FIG. 3: An illustration of the longitudinal cross-section from FIG. 1 (labeled FIG. 3).
Figure 4:
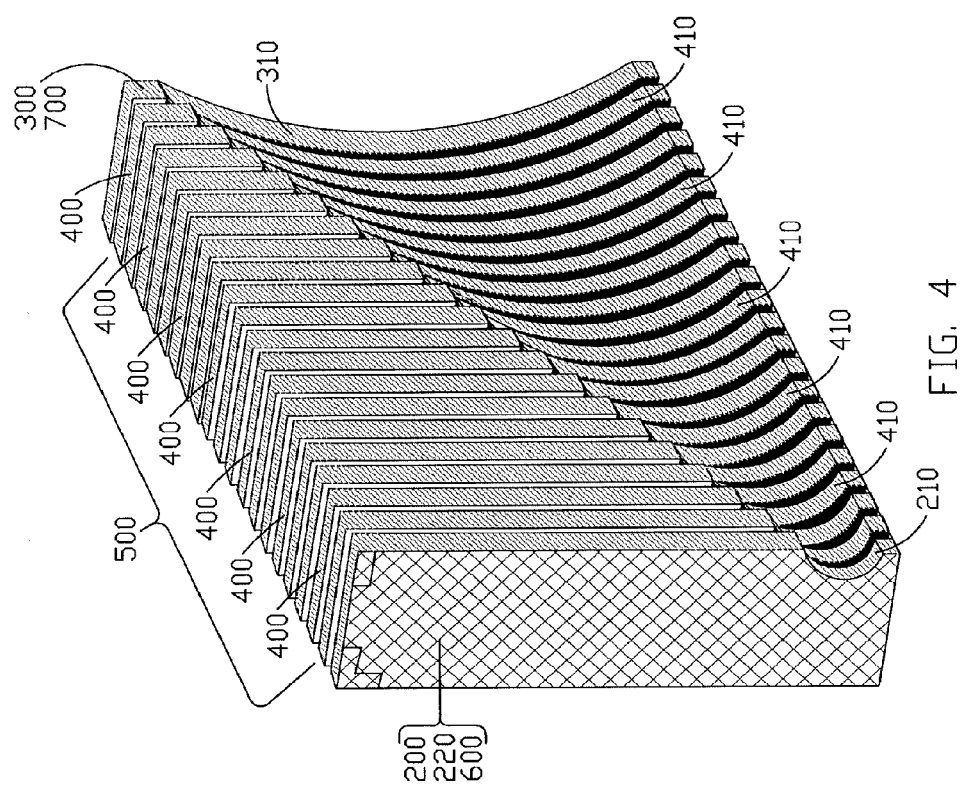
FIG. 4: A perspective view of an embodiment of the reconfigurable barriers comprising two retractable sections 220, the view showing only one section of each barrier and not showing the rest of the flood control structure 1.
Figure 5:
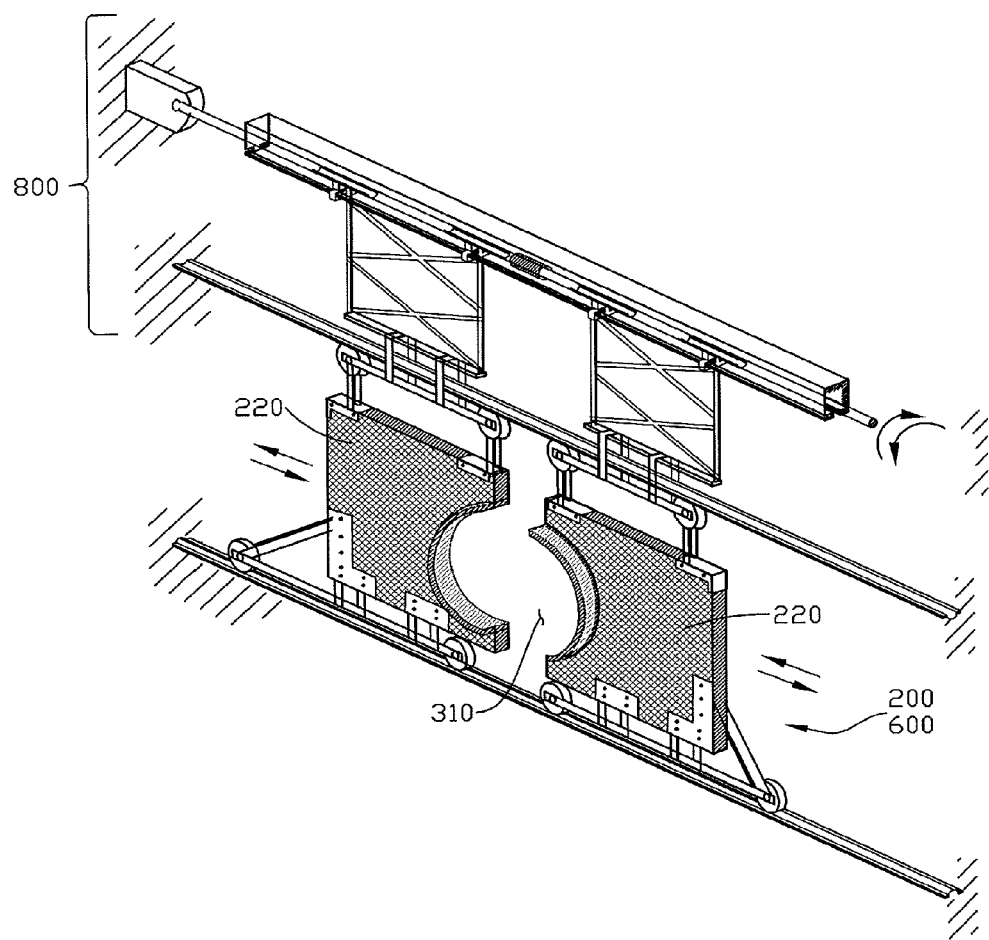
FIG. 5: A perspective view of an embodiment of a single reconfigurable barrier, which serve as the upstream reconfigurable barrier 200/600 or the intermediate reconfigurable barrier 400; not showing the rest of the flood control structure 1.
Figure 6:
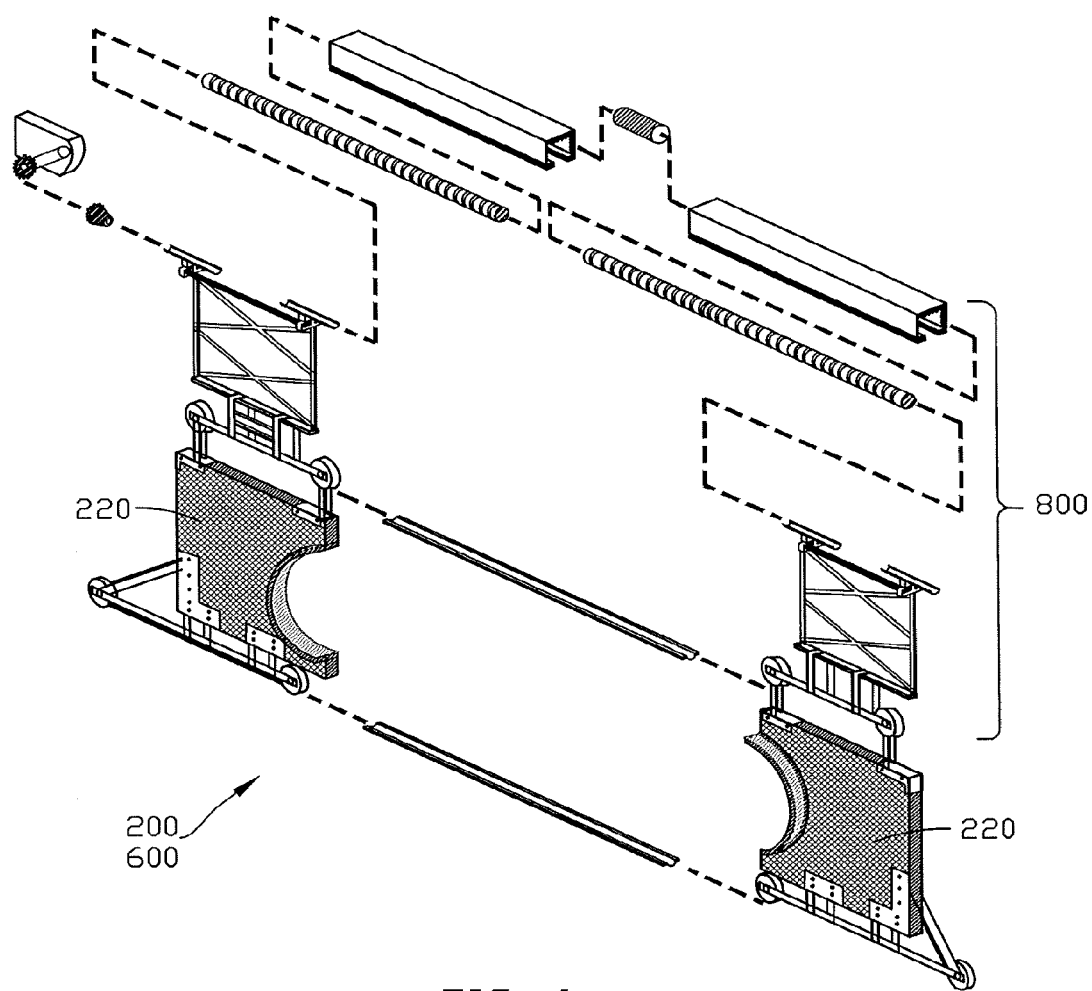
FIG. 6: An exploded view of the embodiment of the reconfigurable barrier shown in FIG. 5.
Figure 7:
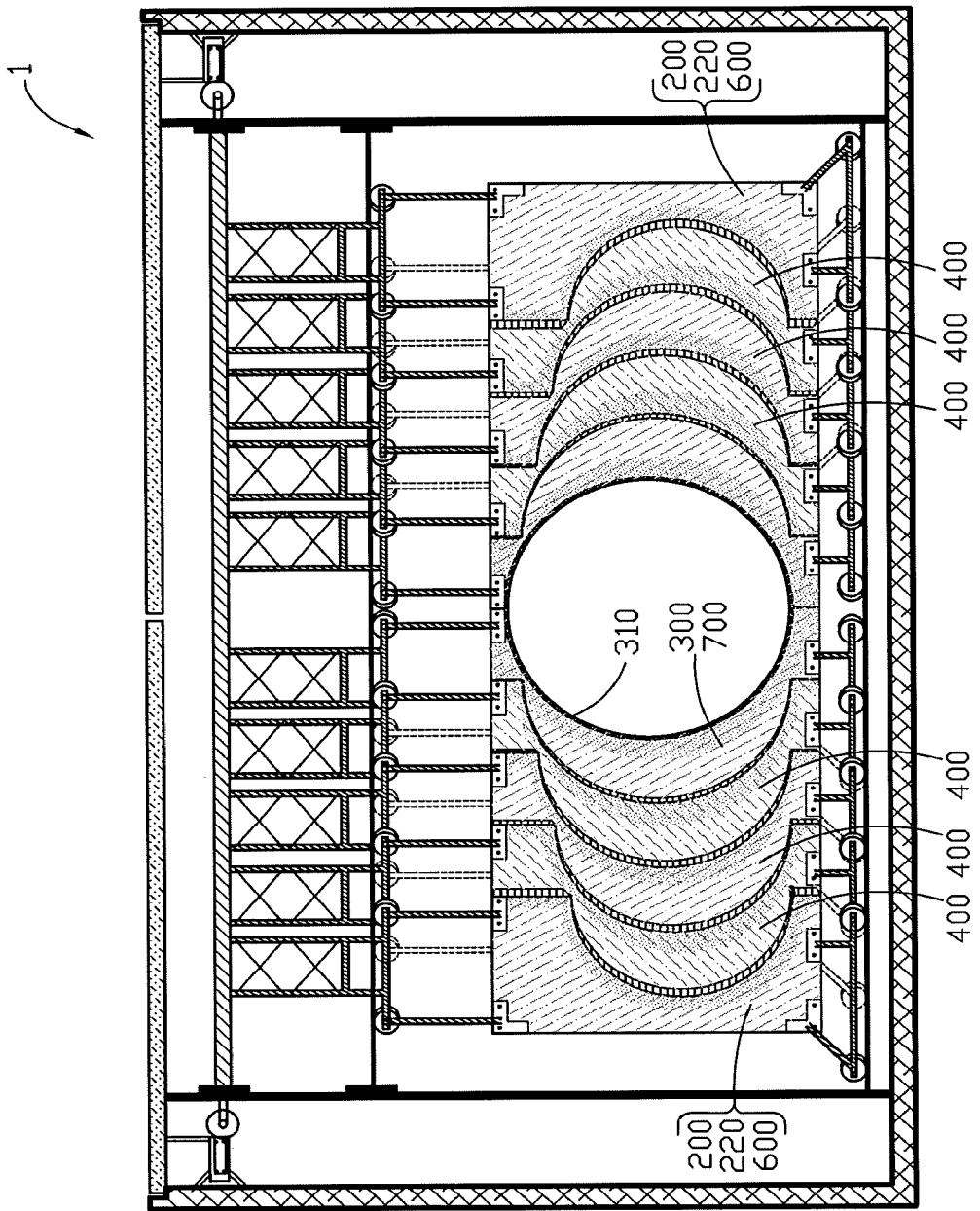
FIG. 7: A frontal plan view of an embodiment of the dynamic flood control structure showing a series 500 of intermediate reconfigurable barriers 400 in their expanded configurations, such that the intermediate orifices are all larger than the downstream orifice 310.

With reference to the use of the word(s) "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The terms "about" or "approximately" mean within a range of reasonable error around a central value. Such reasonable error may for example stem from the precision of an instrument or method used to measure the value. The error could also stem from the precision of a method of making a composition, such as the ability to measure particular ingredients within a margin of error.

The term "machine-readable data storage device" or "data storage device" as used herein refers to a machine-readable device that retains data that can be read by mechanical, optical, or electronic means, for example by a computer. Such devices are sometimes referred to as "memory," although as used herein a machine-readable data storage device cannot comprise a human mind in whole or in part, including human memory. A storage device may be classified as primary, secondary, tertiary, or off-line storage. Examples of a storage device that is primary storage include the register of a central processing unit, the cache of a central processing unit, and random-access memory (RAM) that is accessible to a central processing unit via a memory bus (generally comprising an address bus and a data bus). Primary storage is generally volatile memory, which has the advantage of being rapidly accessible. A storage device that is secondary storage is not directly accessible to the central processing unit, but is accessible to the central processing unit via an input/output channel. Examples of a storage device that is secondary storage include a mass storage device, such as a magnetic hard disk, an optical disk, a drum drive, flash memory, a floppy disk, a magnetic tape, an optical tape, a paper tape, and a plurality of punch cards. A storage device that is tertiary storage is not connected to the central processing unit until it is needed, generally accessed robotically. Examples of a storage device that is tertiary storage may be any storage device that is suitable for secondary storage, but configured such that it is not constantly connected to the central processing unit. A storage device that is off-line storage is not connected to the central processing unit, and does not become so connected without human intervention. Examples of a storage device that is off-line storage may be any storage device that is suitable for secondary storage, but configured such that it is not constantly connected to the central processing unit, and does not become so connected without human intervention. Secondary, tertiary, and offline storage are generally non-volatile, which has the advantage of requiring no source of electrical current to maintain the recorded information.

The term "machine-readable media" as used herein refers to a medium of storing information that is configured to be read by a machine. Such formats include magnetic media, optical media, and paper media (punch cards, paper tape, etc.). Printed writing in a human language, if not intended or configured to be read by a machine, is not considered a machine readable format. In no case shall a human mind be construed as "machine readable format."

Neither a storage device nor machine-readable media can be construed to be a mere signal, although information may be communicated to and from a storage device or machine-readable media via a signal.

The term "database" as used herein refers to an organized data structure comprising a plurality of records stored in machine-readable format.

The term "variable" as used herein refers to a symbolic name corresponding to a binary value stored at a given memory address on a data storage device (although this address may change). The binary value may represent information of many types, such as integers, real numbers, Boolean values, characters, and strings, as is understood in the art. As used herein the value of a variable is always stored in a data storage device, and shall not be construed to refer to information only stored in a human mind. Any recitation of a variable implicitly requires the use of a data storage device.

The terms "about" or "approximately" mean within a range of reasonable error around a central value. Such reasonable error may for example stem from the precision of an instrument or method used to measure the value. The error could also stem from the precision of a method of making a component of a device.

B. Fluid Flow Control Structure

A dynamic fluid flow control structure 1 is provided. In a general embodiment (and as illustrated in FIGS. 1-7), the structure comprises a series of barriers each comprising an orifice, the orifices decreasing in the degree to which they restrict flow as a function of pressure, in the direction of the flow (from the upstream-most orifice to the downstream-most orifice). This restriction in flow is a function of the size of the orifice, the shape of the orifice, or both. The structure functions to control the volumetric rate of flow (also known as "discharge," Q) by directing the fluid flow through a more restrictive orifice (either of smaller size or of a shape that restricts flow) that is upstream of one or more less restrictive orifices (larger or of less restrictive shape). The flow of the fluid will be a function of change in hydrostatic head (h) between the upstream and downstream end of the structure, the diameter (D) of the most restrictive orifice through which the fluid must flow, and the cross-sectional area (A) of the most restrictive orifice through which the fluid must flow. To increase Q at a given h, the most restrictive orifice in the structure is effectively removed. In this context "effectively removed" means that the most restrictive orifice is either expanded in size or altered in shape such that it is no longer the most restrictive orifice in the structure, or the most restrictive orifice may be removed entirely from the device (for example by moving the barrier in which the orifice resides out of the flow of the fluid). This will effectively increase D or A for the orifice (or both), which will increase Q at a given h.

The basic physics of the control structure are provided below. Although the description provided below assumes that the structure is used to control flow from an open body of water to an unsubmerged receiving point, it should be understood that the uses of the control structure are not limited to such scenarios.

Flows that do not submerge the receiving point may be modeled as weir flow and such flows are considered an "unsubmerged condition." Without wishing to be bound by any given hypothetical model, the equation for unsubmerged orifice flow for the structure is:

$$Q = AD^{0.5}\{(h - H_c - C_s D)(KD)^{-1}\}^{(1/m)} \qquad \text{eq. 1}$$

A=cross-sectional area of the orifice;
D=diameter of the orifice;
h=depth of source water;
$H_c$=specific energy at critical depth ($H_c = Y_c + V^2/2g$);
$C_s$=slope correction factor;
K, m=constants determined by the shape of the orifice.

Equation 1 is found in the United States Federal Highway Administration publication "Hydraulic Design of Highway Culverts" HDS-5. During unsubmerged conditions the depth of flow just past the orifice reaches critical depth. Under conditions in which the orifice is completely submerged flow through the orifice can be modeled as follows:

$$Q = C_d A(2gh)^{0.5} \qquad \text{eq. 2}$$

in which $C_d$ is the coefficient of discharge and g is acceleration due to gravity. Under more generalized circumstances, when flow is driven by a pressure differential between two ends of the conduit, submerged orifice flow can be modeled as follows:

$$Q = C_d A(2\Delta P/\rho)^{0.5} \qquad \text{eq. 3}$$

in which $\Delta P$ is the difference in pressure between the inlet and the outlet of the structure and in which $\rho$ is the density of the fluid. Assuming the orifice is of constant size and shape, and assuming that the slope of the conduit is also constant, discharge is a function of the depth of the source water. When the source water is at a given depth, discharge can be modulated by changing the size of the orifice, the shape of the orifice, or both.

In the above equation Q is proportional to the cross-sectional area A of the orifice such that as Q increases the orifice diameter increases. Using an orifice with a given area and shape, assuming that the density of the water is constant (which is true under the conditions relevant to flood control applications), Q becomes a function of the depth of the source water. Under conditions in which the depth of the source water is constant, and the size of the orifice may be varied (but the shape does not vary), Q will be a function of cross-sectional area of the orifice.

These properties can be used to regulate discharge in a flow control structure 1 comprising a plurality of barriers each having an orifice of roughly the same shape, in which each orifice has a minimum size which is smaller than the minimum size of the next orifice downstream in the series. Discharge from the structure is dependent only on the size of the smallest orifice through which the fluid flows. Because the structure varies the smallest orifice size incrementally by effectively removing the smallest orifice in the series, the structure will vary discharge incrementally, as opposed to continuously. Of course, the same type of control could be achieved by providing orifices of varying shapes (or of varying shapes and sizes), although such structures would be more complex in design.

Conventional designs for variably controlling flow rely on flow control devices that constantly vary discharge by constantly varying the size of an opening through which the fluid flows, such as valves and gates. A consequence of this approach is that in order to precisely determine discharge, one must know the precise degree to which the valve or gate is open (more accurately, one must precisely know the size and shape of the opening created by the valve or gate). It is very difficult to monitor the exact degree to which a valve or gate is open without the use of a sensor. In addition, sensors often require periodic calibration if they are to provide accurate measurements. If the exact degree to which the valve or gate is open cannot be readily ascertained, then the resulting discharge cannot be predicted with any degree of precision. Those embodiments of the structure that provide incremental control of discharge provide a technologically simple means to control discharge with greater precision. Some embodiments of the structure function to control the flow of a liquid. The liquid may be an incompressible liquid, water being one example.

In all general embodiments, as many barriers will be present as necessary to provide the desired range of discharge. Some embodiments of the structure 1 comprise one barrier. Other embodiments comprise two or more barriers. Specific embodiments comprise at least 3, at least 4, and at least 16 barriers. In a further specific embodiment the structure comprises at least 36 barriers. In a further specific embodiment the structure comprises at least 72 barriers. In some embodiments of the device the orifices increase in diameter in the downstream direction by an approximately uniform increment; the increment may be, for example, about ½"-6" (or exactly this range). The increment may be any sub-range of ½"-6". In a specific embodiment the increment is ½".

A general embodiment of the structure 1 comprises a fluid conduit 100 through which the fluid flows; an upstream reconfigurable barrier 200 in the conduit 100, the upstream barrier 200 comprising an upstream orifice 210, and the upstream barrier 200 capable of assuming a first upstream configuration and a second upstream configuration; a downstream barrier 300 in the conduit 100, the downstream barrier 300 comprising a downstream orifice 310; wherein the upstream orifice 210 restricts the flow of the fluid more than does the downstream orifice 310 when the upstream barrier 200 assumes the first configuration, and wherein the upstream orifice 210 restricts the flow of the fluid no more than does the downstream orifice 310 when the upstream barrier 200 assumes the second configuration.

An alternate general embodiment of the structure comprises means for providing a first orifice 600 in the path of the fluid flow; means for providing a second orifice 700 larger than the first orifice 600 in the path of the fluid flow downstream from the first orifice; and a structure selected from the group consisting of: (i) means for expanding the first orifice 800 to a size greater than the size of the second orifice; and (ii) means for removing the first orifice 900 from the path of the fluid flow. The means for providing the first orifice 600 may be, for example, the upstream barrier 200. The means for providing the second orifice 700 may be, for example, the downstream barrier 300. The means for expanding the first orifice 800 may be any suitable structure described below; and the means for removing the first orifice 900 may be any suitable structure described below.

In this context a first orifice "restricts" the flow of the fluid more than another orifice if the discharge of the fluid through the first orifice ($Q_1$) is lower than the discharge of the fluid though the other orifice ($Q_2$) under otherwise identical conditions (i.e., same $\Delta P$, same conduit 100 diameter, same $C_d$, same depth of the source water). Under conditions in which equation 2 controls, a first orifice "restricts" the flow of the fluid more than another orifice if the $C_d A$ value of the first orifice is smaller than the $C_d A$ value of the other orifice. If both orifices are of the same shape, the first orifice will have a smaller diameter and a smaller cross-sectional area than the other orifice. Thus, in some embodiments of the structure, the upstream orifice 210 has a lesser upstream $C_d A$ value when the upstream barrier 200 assumes the first upstream configuration; the upstream orifice 210 has a greater upstream $C_d A$ value when the upstream barrier 200 assumes the second upstream configuration; the downstream orifice 310 has a downstream $C_d A$ value; the lesser upstream $C_d A$ value is smaller than the greater upstream $C_d A$ value; the lesser upstream $C_d A$ value is less than the downstream $C_d A$ value; and the greater upstream $C_d A$ value is not less than the downstream $C_d A$ value.

Some embodiments of the upstream orifice 210 will be designed to vary in size so as to control fluid flow. In such embodiments the upstream orifice 210 is a contracted upstream size when the upstream barrier 200 assumes the first upstream configuration; the upstream orifice 210 is an expanded upstream size when the upstream barrier 200 assumes the second upstream configuration; the downstream orifice 310 is a downstream orifice 310 size; the contracted upstream size is smaller than the expanded upstream size; the contracted upstream size is smaller than the downstream orifice 310 size; and the expanded upstream size is no smaller than the downstream orifice 310 size. The shape of the upstream orifice 210 and the downstream orifice 310 will have about the same ratio of diameter to cross-sectional area in some such embodiments (resulting in about the same $C_d A$ if the two orifices are about the same size). In these embodiments the upstream barrier 200 is reconfigured to increase or decrease the size of the upstream orifice 210. This can be accomplished by various means of expanding and contracting an orifice as known in the art. For example, the upstream orifice 210 may be expanded and contracted using an iris valve or a gate valve.

Specific embodiments of the reconfigurable upstream barrier 200 comprise a plurality of retractable sections 220. The sections are "retractable" in that they may be retracted away from one another to increase the size of the orifice (and in most embodiments the retractable sections 220 can then be extended toward one another). The upstream reconfigurable barrier 200 may comprise two retractable sections 220. Some versions of the upstream barrier 200 can be reconfigured such that the two retractable sections 220 are retracted at least partially from the conduit 100 in the second upstream configuration and are fully extended into the conduit 100 in the first upstream configuration.

In some embodiments the retractable sections 220 themselves will at least partially define the rim of the orifice. In some such embodiments, the upstream reconfigurable barrier 200 comprises two retractable sections 220 that are retracted at least partially from the conduit 100 in the second upstream configuration and that are fully extended into the conduit 100 in the first upstream configuration; and each of the two retractable sections 220 define a portion of the perimeter of the upstream orifice 210. Each of the two retractable sections 220 may define half of the perimeter of the upstream orifice 210. In a specific embodiment the upstream reconfigurable barrier 200 comprises two retractable sections 220 that each define a semicircular portion of a circular orifice 210 such that when extended into contact with one another, they create a circular orifice in the barrier 200. In other related embodiments the retractable sections 220 each define half of an orifice 210 of another shape, for example an orifice that is a rectangle, square, polygon, oval, or an ellipse. If the reconfigurable barrier 200 comprises more than two retractable sections 220, then each retractable section 220 may define a portion of the perimeter of the orifice 210. In some embodiments each of the more than two retractable sections 220 will define an equal fraction of the portion of the perimeter of the orifice 210. For example, if three retractable sections 220 are used they may each define one third of the perimeter of the orifice 210; if four retractable sections 220 are used they may each define one quarter of the perimeter of the orifice 210; and so on.

The sections 220 may be extended and retracted by any means known in the art. For example, given sections 220 may be slid toward and away from one another in a direction perpendicular to the direction of flow. Such embodiments have the advantage of never moving the sections 200 against the flow of the fluid. The sections 220 may be slid along tracks that are recessed in the conduit 100. In a specific embodiment the reconfigurable barrier comprises two retractable sections 220, each of which is connected to a threaded rod that may be rotated in either direction to retract or extend each section 220.

In some embodiments of the reconfigurable barrier 200 in which the upstream orifice 210 assumes a contracted and expanded size (in the first and second configurations, respectively), the upstream orifice 210 is maximally contracted in the first upstream configuration. In some embodiments, the upstream orifice 210 is maximally expanded in the second upstream configuration. In more specific embodiments the upstream orifice 210 is maximally contracted in the first upstream configuration and the upstream orifice 210 is maximally expanded in the second upstream configuration. In such embodiments the orifice can be placed in the first configuration by contracting it as much as possible, and placed in the second configuration by expanding it as much as possible. This eliminates the need to assess the degree to which the orifice 210 is expanded or contracted in order to determine the extent to which the orifice 210 restricts the flow of the fluid. In some embodiments of the structure, the upstream reconfigurable barrier 200 is inserted into the conduit 100 when in the first upstream configuration and the upstream reconfigurable barrier 200 is withdrawn from the conduit 100 when in the second upstream configuration. Thus, instead of varying the size or shape of the orifice 210, the barrier 200 is reconfigured by removing the barrier 200 and the orifice 210 from the conduit 100 altogether.

Some embodiments of the structure 1 comprise an intermediate reconfigurable barrier 400. Such embodiments comprise an intermediate reconfigurable barrier 400 in the conduit 100 between the upstream barrier 200 and the downstream barrier 300. The intermediate barrier 400 comprises an intermediate orifice 410, and the intermediate barrier 400 is capable of assuming a first intermediate configuration and a second intermediate configuration. The intermediate orifice 410 restricts the flow of the fluid more than does the downstream orifice 310 when the intermediate barrier 400 assumes the first configuration. The intermediate orifice 410 restricts the flow of the fluid no more than does the downstream orifice 310 when the intermediate barrier 400 assumes the second configuration. The upstream orifice 210 restricts the flow of the fluid more than does the intermediate orifice 410 when the upstream barrier 200 assumes the first configuration and the intermediate barrier 400 assumes the first configuration. The upstream orifice 210 restricts the flow of the fluid no more than does the intermediate orifice 410 when the upstream barrier 200 assumes the second configuration and the intermediate orifice 410 assumes the first configuration. Consequently, the intermediate barrier 400 can function to provide an intermediate level of flow control (allowing less flow than the upstream barrier 200, but more than the downstream barrier 300).

Some embodiments of the intermediate barrier 400 can be reconfigured to expand or contract the size of the intermediate orifice 410. In such embodiments of the intermediate barrier 400, the intermediate orifice 410 is a contracted intermediate size when the intermediate barrier 400 assumes the first intermediate configuration, and the intermediate orifice 410 is an expanded intermediate size when the intermediate barrier 400 assumes the second intermediate configuration. In some embodiments of the device in which the intermediate orifice 410 may be expanded or contracted, the upstream orifice 210 is a contracted upstream size when the upstream barrier 200 assumes the first upstream configuration, and the upstream orifice 210 is an expanded upstream size when the upstream barrier 200 assumes the second upstream configuration. The downstream orifice 310 can be said to have a downstream orifice 310 size. The contracted upstream size is smaller than the expanded upstream size. The contracted intermediate size is smaller than the expanded intermediate size. The contracted upstream size is smaller than the contracted intermediate size. The contracted intermediate size is smaller than the downstream orifice 310 size. The expanded upstream size is no smaller than the downstream orifice 310 size. The expanded intermediate size is no smaller than the downstream orifice 310 size. Thus, neither the upstream 210 nor intermediate 410 orifices in their expanded configurations are smaller than the downstream orifice 310, although both are smaller in their contracted configurations than the downstream orifice 310. When the intermediate orifice 410 is contracted it is larger than the upstream orifice 210 when it is contracted.

In the above description, the $C_dA$ value can serve to replace any mention of "size," although it is to be understood that the $C_dA$ value can be affected by shape as well as by size. Taking into consideration the role of the $C_dA$ value in determining the rate of discharge through an orifice, in some embodiments of the structure the upstream orifice 210 has a lesser upstream $C_dA$ value when the upstream barrier 200 assumes the first upstream configuration, and the upstream orifice 210 has a greater upstream $C_dA$ value when the upstream barrier 200 assumes the second upstream configuration. The lesser upstream $C_dA$ value is smaller than the greater upstream $C_dA$ value. The downstream orifice 310 may be said to have a downstream $C_dA$ value. The intermediate orifice 410 has a lesser intermediate $C_dA$ value when the intermediate barrier 400 assumes the first intermediate configuration; and a greater intermediate $C_dA$ value when the intermediate barrier 400 assumes the second intermediate configuration. The lesser intermediate $C_dA$ value is smaller than the greater intermediate $C_dA$ value. The lesser upstream $C_dA$ value is smaller than the lesser intermediate $C_dA$ value; the lesser intermediate $C_dA$ value is smaller than the downstream $C_dA$ value; the greater upstream $C_dA$ value is no smaller than the downstream $C_dA$ value; and the greater intermediate $C_dA$ value is no smaller than the downstream $C_dA$ value.

In an alternative embodiment of the intermediate barrier 400, the intermediate reconfigurable barrier 400 is inserted into the conduit 100 when in the first intermediate configuration and the intermediate reconfigurable barrier 400 is withdrawn from the conduit 100 when in the second intermediate configuration. As described for the upstream barrier 200 above, in these embodiments the barrier is simply removed from the fluid flow instead of being reconfigured to change the size or shape of the orifice.

Some embodiments of the structure comprise a series 500 of reconfigurable intermediate barriers 400 between the upstream 200 and downstream 300 barriers each comprising an intermediate orifice 410. In such embodiments each of the intermediate barriers 400 have a first intermediate configuration, a second intermediate configuration, and a given intermediate orifice 410 restricts the flow of the fluid more than does the orifice immediately downstream when the given intermediate barrier 400 assumes the first intermediate configuration. The given intermediate orifice 410 reduces the flow of the fluid no more than does the orifice immediately downstream when the given intermediate barrier 400 assumes the second configuration. Such embodiments of the device allow incremental control of the rate of discharge of the fluid through the conduit 100 by reconfiguring each intermediate barrier 400 as needed such that the upstream-most intermediate barrier 400 restricts the flow to a greater extent than any barrier downstream.

As in the intermediate barrier 400 described above, each of the series of intermediate barriers 400 may be reconfigured by expanding or contracting the orifice. In some embodiments of the structure each intermediate orifice 410 is a contracted intermediate size when the intermediate barrier 400 assumes the first intermediate configuration and each intermediate orifice 410 is an expanded intermediate size when the intermediate barrier 400 assumes the second intermediate configuration. In such embodiments the contracted intermediate size of a given intermediate orifice 410 is smaller than the size of the orifice immediately downstream; and the expanded intermediate size of the given intermediate orifice 410 is no smaller than the size of the orifice immediately downstream. In further such embodiments the orifice in the downstream barrier 300 can be said to have a downstream orifice 310 size, and the expanded size of each intermediate orifice 410 is no smaller than the downstream orifice 310 size.

Again, when a series 500 of reconfigurable intermediate barriers 400 is present, each may serve to reduce the rate of discharge by providing an orifice having a given $C_dA$ value, instead of a given size (although of course the $C_dA$ value may be varied by varying the size). In such embodiments, each given intermediate orifice 410 has a lesser intermediate $C_dA$ value when the given intermediate barrier 400 assumes the first intermediate configuration and a greater intermediate $C_dA$ value when the given intermediate barrier 400 assumes the second intermediate configuration. The lesser intermediate $C_dA$ value is smaller than the greater intermediate $C_dA$ value. The lesser intermediate $C_dA$ value of the given intermediate barrier 400 is smaller than $C_dA$ value of the orifice immediately downstream; and the greater intermediate $C_dA$ value is no smaller than the $C_dA$ value of the orifice immediately downstream.

In further such embodiments, it can be said that the orifice in the downstream barrier 300 has a downstream $C_dA$ value; the lesser intermediate $C_dA$ value of each intermediate barrier 400 is smaller than the downstream $C_dA$ value; and the greater intermediate $C_dA$ value of each intermediate barrier 400 is no smaller than the downstream $C_dA$ value.

In another embodiment of the device comprising a series 500 of reconfigurable intermediate barriers 400, the intermediate barriers 400 are reconfigured by inserting or withdrawing them from the conduit 100. In such embodiments each intermediate orifice 410 is inserted into the conduit 100 when the intermediate barrier 400 assumes the first intermediate configuration; and each intermediate orifice 410 is withdrawn from the conduit 100 when the intermediate barrier 400 assumes the second intermediate configuration. As described in other embodiments, this allows the barriers 400 to simply be removed from the fluid flow instead of reconfiguring the barrier 400 to change the characteristics of the orifice 410.

A method is provided for controlling fluid flow through a conduit 100 wherein the conduit 100 comprises an upstream orifice 210 and a downstream orifice 310, the method comprising: reconfiguring the upstream orifice 210 from a configuration in which the upstream orifice 210 reduces the flow of the fluid more than does the downstream orifice 310 to a configuration in which the upstream orifice 210 reduces the flow of the fluid no more than does the downstream orifice 310. The step of reconfiguring the upstream orifice 210 may comprise increasing the size of the upstream orifice 210. In some embodiments the step of reconfiguring the upstream orifice 210 comprises changing the shape of the upstream orifice 210.

The step of reconfiguring the upstream orifice 210 may comprise increasing the $C_dA$ value of the orifice. In some embodiments of the method the upstream orifice 210 is in an upstream barrier 200, and the method comprises withdrawing the upstream barrier 200 from the conduit 100. A method is provided for controlling fluid flow through a conduit 100 comprising providing any of the fluid flow control structures 1 described herein and reconfiguring at least one of the upstream barrier 200 or an intermediate barrier 400 from its first configuration to its second configuration.

Turning now to the prophetic example in FIGS. 1-7, an embodiment of the structure is provided as a conduit 100 comprising a series of orifice plates, each plate containing an orifice ranging in diameter from 1-36" in one-half inch increments. Thus there are 72 plates. The most upstream plate contains no orifice (when closed it arrests flow completely). The next plate downstream comprises the smallest orifice (1" in diameter). Each plate comprises two retractable sections 220. Each plate is rectangular, having a cross sectional area equal to or slightly greater than the cross-sectional area of the conduit 100. The orifice is in the middle of each plate. Each retractable section 220 makes up half the plate and defines the perimeter of half of the orifice. Each retractable section 220 is configured to be retracted from the conduit 100 in a direction opposite to the other retractable section 220 of the plate. This is achieved by means of a threaded rod bolt attached to the retractable section 220 by an anchor plate. A reversible electric motor with a worm gear is used to move the threaded bolt in either direction, which causes the retractable section 220 to either retract from the conduit 100 or extend into the conduit 100. Once the retractable sections 220 meet, they cannot be extended into the conduit 100 any further. Consequently, when the retractable sections 220 meet, they mutually define the orifice at its minimum size. Retracting the retractable sections 220 causes the effective size of the orifice to increase. Because each orifice is only one-half inch narrower than the next orifice downstream, if each retractable section 220 for a given orifice plate is retracted only ¼" then the next orifice downstream effectively controls discharge from the conduit 100. Of course, each plate is capable of being retracted to an extent that will allow its orifice to assume a diameter that is at least equal to the diameter of the largest orifice in the structure (which would be the orifice in the most downstream plate).

In a specific embodiment, the series of barriers fit together to form a conduit 100 with a water tight connection throughout the structure. By doing so, flow through the most restrictive opening operates under inlet control and each subsequent less restrictive downstream opening is a component of the conduit 100 to convey the flow through the structure. Inlet control occurs when the control is immediately upstream of the most restrictive orifice and headwater depth and orifice configuration determine the amount of water entering the structure. Under inlet control conditions the amount of water entering the structure at the most restrictive opening is less than the conduit's 100 flow capacity. Consequently, the conduit 100 is flowing less than full.

C. Flood Control System

A flood control system 3000 that provides a volumetric discharge pattern during an ongoing storm event is provided. A general embodiment of the system comprises: a flow control structure 1000 configured to variably control the rate of volumetric discharge from an intake point to a release point; a computing device 1100 in control of the flow control structure 1000; a water level meter 1200 positioned to measure the water level at the intake point and configured to transmit water level data to the computing device 1100; a rain gauge 1300 configured to transmit rainfall data to the computing device 1100; and a machine-readable data storage device 1400 comprising a plurality of storm flow functions that each set a rate of volumetric discharge as a function of rainfall rate, wherein the machine-readable data storage device 1400 is configured to be read by the computing device 1100. The flow control structure 1000 may be any known in the art. In specific embodiments of the system the flow control structure 1000 is any one of the dynamic flood control structures 1 provided in this disclosure.

Either of both of the water level meter 1200 and the rain gauge 1300 may be configured to transmit data they collect to the computing device 1100 with very little delay between the time at which the data are collected and the time at which the data are transmitted. Such "real time" data transmission has the advantage of providing the computing device 1100 with a constant stream of up to date information. Alternatively there may be a small delay between data collection and transmission, so long as the delay allows the computing device 1100 to send instructions to the flood control structure based on the data in a timely manner. Such small delays have the advantage of saving energy by sending less frequent signals.

The computing device 1100 is specifically configured or programmed to control the flow control structure 1000 in response to data from the one or both of the rainfall gauge and the water level meter 1200 based on an ongoing storm event. The computing device 1100 includes a bus or other communication mechanism for communicating information, and a processor coupled with bus for processing information. The computing device 1100 may also include a main memory, such as a random access memory (RAM) or other dynamic storage device, coupled to the bus for storing information and instructions to be executed by the processor. Main memory also may be used for storing temporary, variable or other intermediate information during execution of instructions to be executed by the processor. The computing device 1100 further includes a read only memory (ROM) or other static storage device coupled to the bus for storing static information and instructions for the processor.

The water level meter 1200 may be any that is known in the art. Non-limiting examples include sonic level sensors, guided-wave radar level sensors, pressure sensors, float-based level sensors, and vibrating short-fork sensors. The water level meter 1200 transmits water level measurements to the computing device 1100. The water level measurements may be transmitted periodically or constantly. In some embodiments of the system water level measurements are transmitted to the computing device 1100 only after a rainfall event has been detected via the rain gauge 1300.

The rain gauge 1300 may be any known in the art that is capable of automated reporting. Non-limiting examples include a weighing precipitation gauge, a tipping bucket rain gauge, an optical rain gauge, and an acoustic rain gauge. The rain gauge 1300 may transmit digital or analog signals correlated to measured rainfall.

Each storm flow function is recorded on machine-readable media and allows a rate of volumetric discharge to be calculated from a rainfall rate. The rainfall rate may be any of various types of measurements. Non-limiting examples of the rainfall rate include a peak rate of rainfall, and average rate of rainfall over the course of the event, an incremental rate of rainfall, an instantaneous rate of rainfall, a running average rate of rainfall over a given period, and a total amount (depth) of rainfall over the course of the event.

The function may be derived from a modeled rainfall event, such as a two-year storm event, a 25-year storm event, and a 100-year storm event. The function may be derived from an historic storm event. Any number of functions may be recorded on the data storage device 1400. In a specific embodiment, the data storage device 1400 contains a function derived from a two-year storm function, a 25-year storm function, and a 100-year storm function. The function may be a function of a pre-development rainfall event.

The intake point may be any point at which standing water would be expected to be present during a rainfall event (regardless of whether standing water would be present at the point apart from the rainfall event). Non-limiting examples of likely intake points include a drainage ditch, a detention pond, a subterranean drain, a controlled section of a watercourse, and a storm drain. One specific embodiment of the intake point is a retention body 1500. The rain gauge 1300 will be positioned at a location that would be representative of the watershed. Non-limiting examples of suitable rain gauge 1300 positions include any nearby location in a static open body of water (such as a lake or a pond), a location within the watershed open to the sky, or at a location about the same point in the grade of the structure.

An alternate embodiment of the flood control system 3000 comprises a means for variably controlling the rate of volumetric discharge 1600 from an intake point to a release point; a means for automated control 1700 of the means for variably controlling the rate of volumetric discharge 1600; means for measuring the water level 1800 at the intake point that transmits water level data to the means for automated control 1700; means for measuring rainfall 1900 that transmits rainfall data to means for automated control 1700; and means for storing a plurality of storm flow functions 2000 that is readable by the means for automated control 1700. The means for variably controlling the rate of volumetric discharge 1600 may be, for example, any of the flow control structures 1000 described herein. The means for automated control 1700 of the means for variably controlling the rate of volumetric discharge 1600 may be, for example, any embodiment of the computing device described herein. The means for measuring the water level may be, for example, any embodiment of the rain gauge described herein. The means for storing a plurality of storm flow functions 2000 that is readable by the means for automated control 1700 may be, for example, any embodiment of the machine-readable data storage device described herein.

Figure 8:
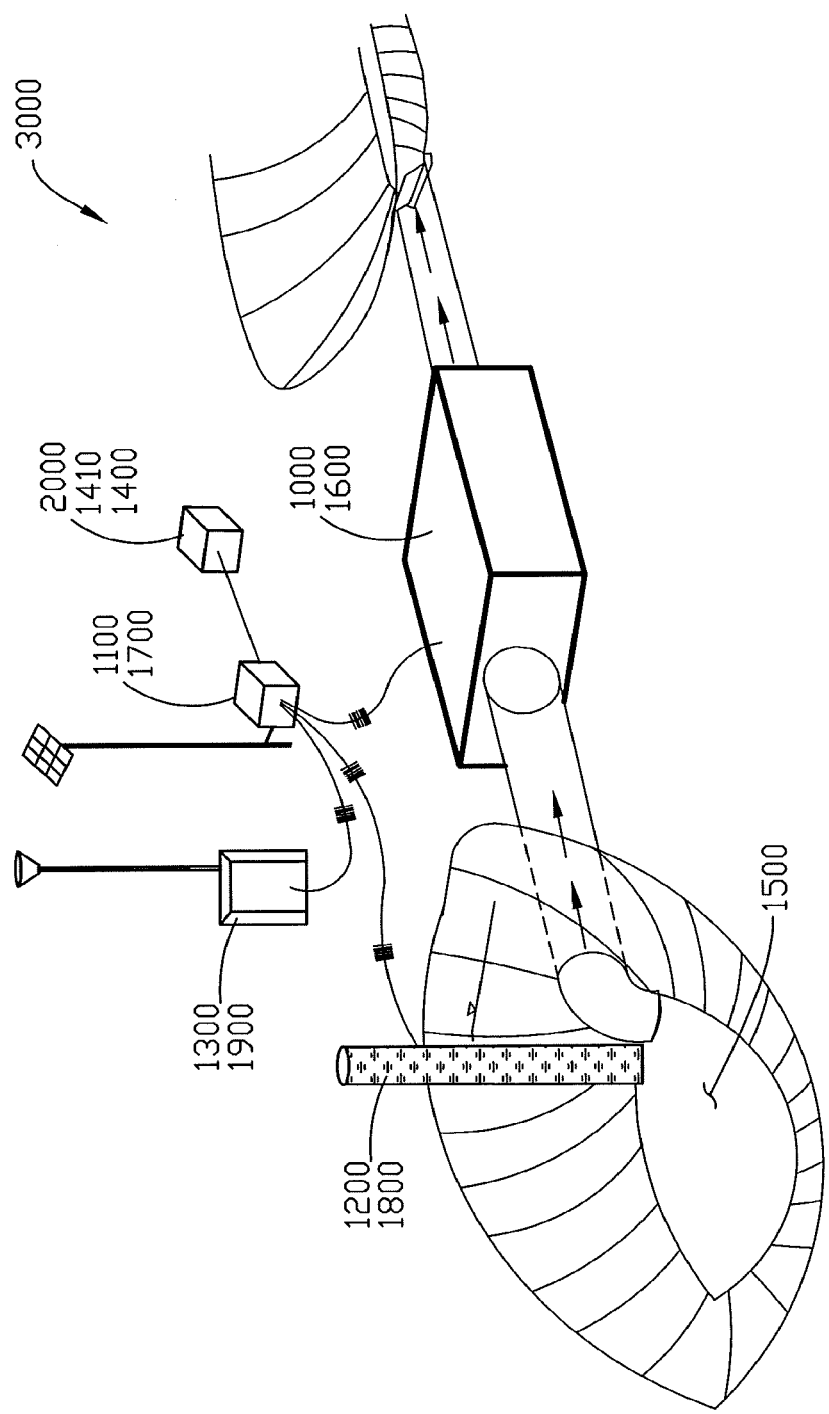
FIG. 8: A perspective view of en embodiment of the flood control system.

Turning now to the prophetic example in FIG. 8, an embodiment is provided in which the intake point is at a downstream opening in a detention pond, which leads to the embodiment of the flood control structure provided in FIGS. 1-7, and which then leads to a discharge pipe and discharges into a receiving stream. The water level meter 1200 is a float device proximate to the storm pipe which transmits water level measurements to the computing device 1100 at one minute intervals. An electronic rain gauge 1300 accurate to about 0.001" is connected to the computing device 1100. The computing device 1100 is connected to and controls the flow control structure 1000. The computing device 1100 communicates with a storage device (not shown) that calculates a rate of discharge that is equivalent to the pre-developed condition based on data transmitted by the rain gauge 1300.

D. Flood Control Process

A flood control process is provided for achieving a predetermined volumetric discharge pattern in response to a rainfall event. A general embodiment of the process comprises: receiving a rainfall measurement from an automated rain gauge 1300; reading a storm discharge function 1410 from a machine-readable storage device 1400, wherein the storm discharge function 1410 sets a rate of volumetric discharge as a function of rainfall rate; computing a target rate of volumetric discharge by plugging a rainfall rate value into the function 1410; and configuring a flow control structure 1000 to provide approximately the target rate of volumetric discharge from the body of water. In some embodiments of the method the predetermined volumetric discharge pattern approximates or recreates a discharge pattern for the local watershed in a natural or undeveloped state.

The process may comprise selecting a storm discharge function 1410 that corresponds to a measurement of storm severity. The measurement of storm severity may be obtained from the automated rain gauge 1300 in some embodiments. For example, the total accumulated rainfall could be used to measure storm severity. In another example, a predicted peak flow rate to or from a given body of water could be used to measure storm severity. In another example the rainfall rate could be used to measure storm severity. In embodiments of the method in which the storm discharge function 1410 is selected based on storm severity, the discharge function corresponds to a storm of comparable severity to the ongoing storm. For example, the storage device may contain four discharge functions: one corresponding to a two-year 24-hour model storm, one corresponding to a 25-year 24-hour storm, and one corresponding to a 100-year 24-hour storm. Such functions may be selected if the severity of the storm rises above certain threshold levels. Examples of such threshold levels include a threshold total rainfall depth, a threshold predicted peak flow rate, and a threshold rainfall rate.

In a prophetic example, during a storm event a function may be initially selected that corresponds to a storm that is less severe than a two-year 24-hour storm. Upon receipt of a rainfall measurement indicating that the total rainfall depth threshold defining a two-year 24-hour storm has been reached, a function corresponding to a storm more severe than a two-year 24-hour storm may be selected. Upon receipt of a rainfall measurement indicating that the total rainfall threshold defining a 25-year 24-hour storm has been reached, a function corresponding to a storm more severe than a 25-year 24-hour storm may be selected. Upon receipt of a rainfall measurement indicating that the total rainfall threshold defining a 100-year 24-hour storm has been reached, a function 1410 corresponding to a storm more severe than a 100-year 24-hour storm may be selected. The target rate of volumetric discharge may be constantly calculated using the selected function 1410 and the rainfall rate, and the flow control structure 1000 may be constantly configured to provide approximately the target rate of volumetric discharge from the body of water. As the severity of the storm changes, the selected function 1410 changes.

In some versions of the process, once a function 1410 corresponding to a storm of a given severity has been selected, the process will not select a function 1410 corresponding to a less severe storm during the course of the storm, even if the severity of the storm decreases. In such embodiments the function 1410 may change if the severity of the storm increases, but not if it decreases. Such measures may often be necessary because it is inevitable that even the most severe storm will pass and decrease in severity; however it may still be desirable to simulate the trailing portion of the severe storm during this period, as opposed to simulating a less severe storm.

The functions 1410 associating target discharge to rainfall rate may be based on the hydrologic parameters of the watershed. In certain embodiments of the process some or all of the hydrologic parameters may be stored in a "junction summary file" on a machine-readable storage device 1400. For example, such parameters may include a weighted curve number, a time of concentration, and the area of watershed. The curve number (also known as runoff curve number) is based on the permeability of the groundcover of the watershed, and represents the rate of surface runoff flow (volume per time) as a function of total rainfall (depth); the runoff curve number will in some cases be based on the pre-development watershed. Time of concentration represents the time required to for water to flow from the most hydraulically remote location in the watershed to a drainage point (in this case the drainage point is the body of water at the intake point of the control structure).

Some embodiments of the process allow a user to select the appropriate function 1410. For example, if the severity of an ongoing storm increases above a threshold (for example, more severe than a two-year 24-hour storm but less than or equal to a 25-year 24-hour storm) the user may be presented with the option to continue to use the function 1410 corresponding to the less severe storm, or to switch to the function corresponding to the more severe storm. In another example, the severity of the ongoing storm may be below a threshold, and the user is presented with the option to use the function 1410 corresponding to a more severe storm. This option to select the function 1410 associated with the more severe storm event could be used in cases in which the required volume of the upstream reservoir is not achievable due to some hardship, such as a limited amount of area available for storm water detention. Simulating a more severe storm will increase flow from the upstream reservoir.

Some embodiments of the process comprise configuring the flow control structure 1000 to provide a constant drainage rate of discharge after the storm event is complete. More specific embodiments of the process comprise receiving a later rainfall measurement from the rain gauge 1300, wherein the later rainfall measurement is below a threshold value indicative of the termination of the storm event. The threshold value may be zero, or about zero. The constant rate of discharge will be sufficient to prevent adverse impacts downstream of the flow control structure 1000. The constant flow rate may be based on at least one of the capacity of the downstream receiving body or bodies, the ecological sensitivity of the downstream receiving body or bodies, the erosional sensitivity of the downstream receiving body or bodies, water rights in the downstream receiving body or bodies, and other environmental sensitivities in the downstream receiving body or bodies. Such embodiments allow the upstream source water body to be drained without adverse downstream impacts. In some embodiments of the process the constant drainage rate will be provided until the upstream source water body reaches a predetermined depth. In some cases the predetermined depth may be zero, in which case the upstream source water body will be drained.

The water level gauge, source point, machine-readable data storage device 1400, storm flow function 1410, and flow control structure 1000 may be any that are described herein as suitable for the flood control system.

Figure 9:
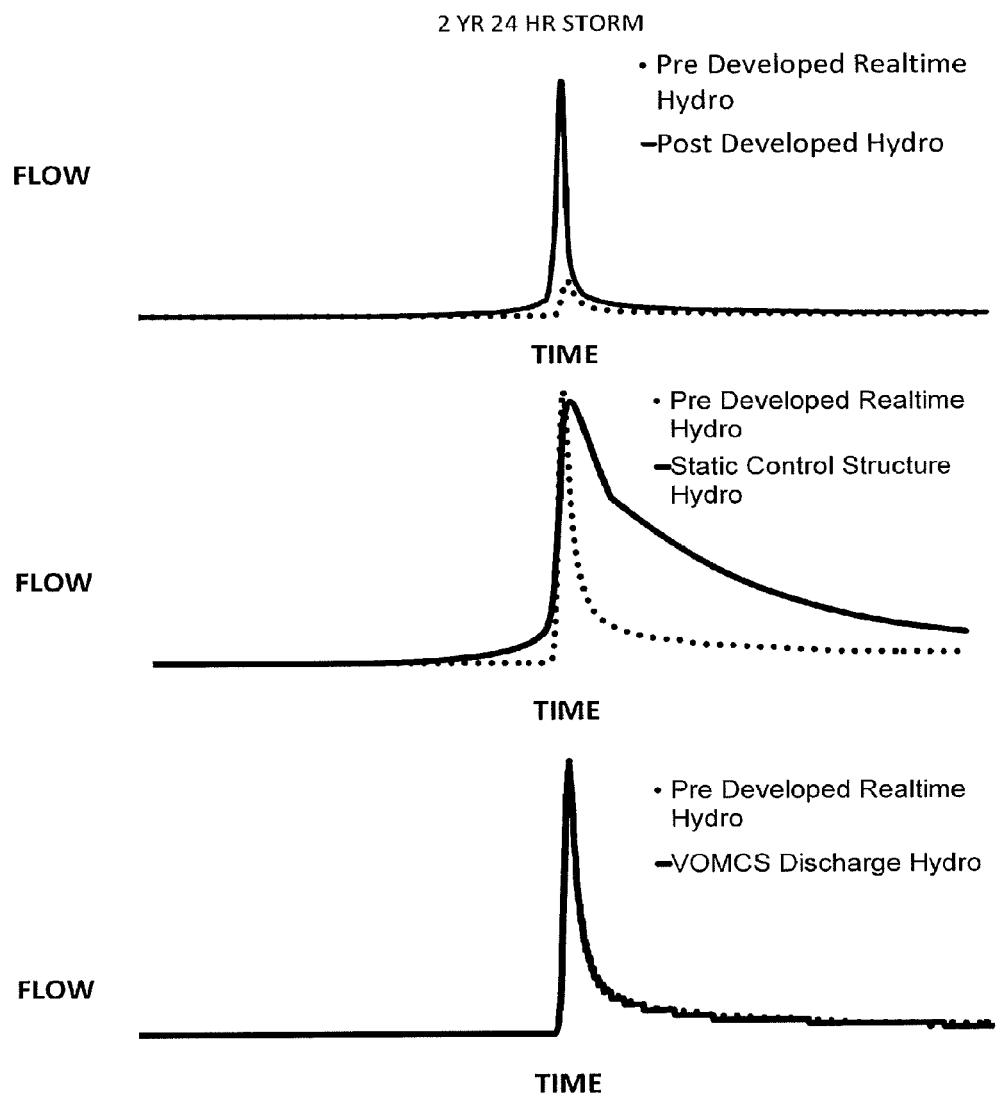
FIG. 9: Modeled results of discharge over time from a retaining body to a receiving water during a two-year storm event in a developed basin that was previously undeveloped. The top frame compares uncontrolled post-developed discharge to pre-developed discharge. The middle frame shows a comparison of post-developed discharge controlled by a static flood control structure to pre-developed discharge. The bottom frame shows a comparison of post-developed discharge controlled according to an embodiment of the flood control method provided in this application to pre-developed discharge.
Figure 10:
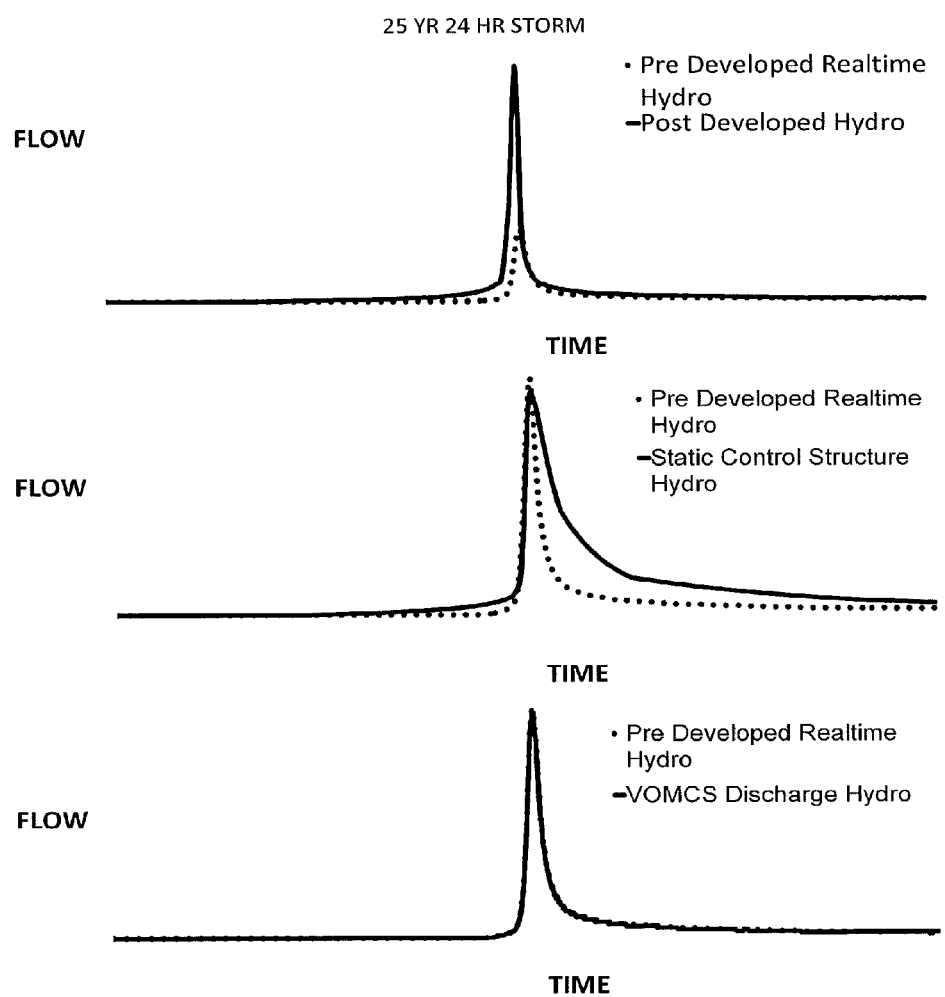
FIG. 10: Modeled results of discharge over time for the same drainage basin as in FIG. 9, but for a 25-year storm event. The top frame compares uncontrolled post-developed discharge to pre-developed discharge. The middle frame shows a comparison of post-developed discharge controlled by a static flood control structure to pre-developed discharge. The bottom frame shows a comparison of post-developed discharge controlled according to an embodiment of the flood control method provided in this application to pre-developed discharge.
Figure 11:
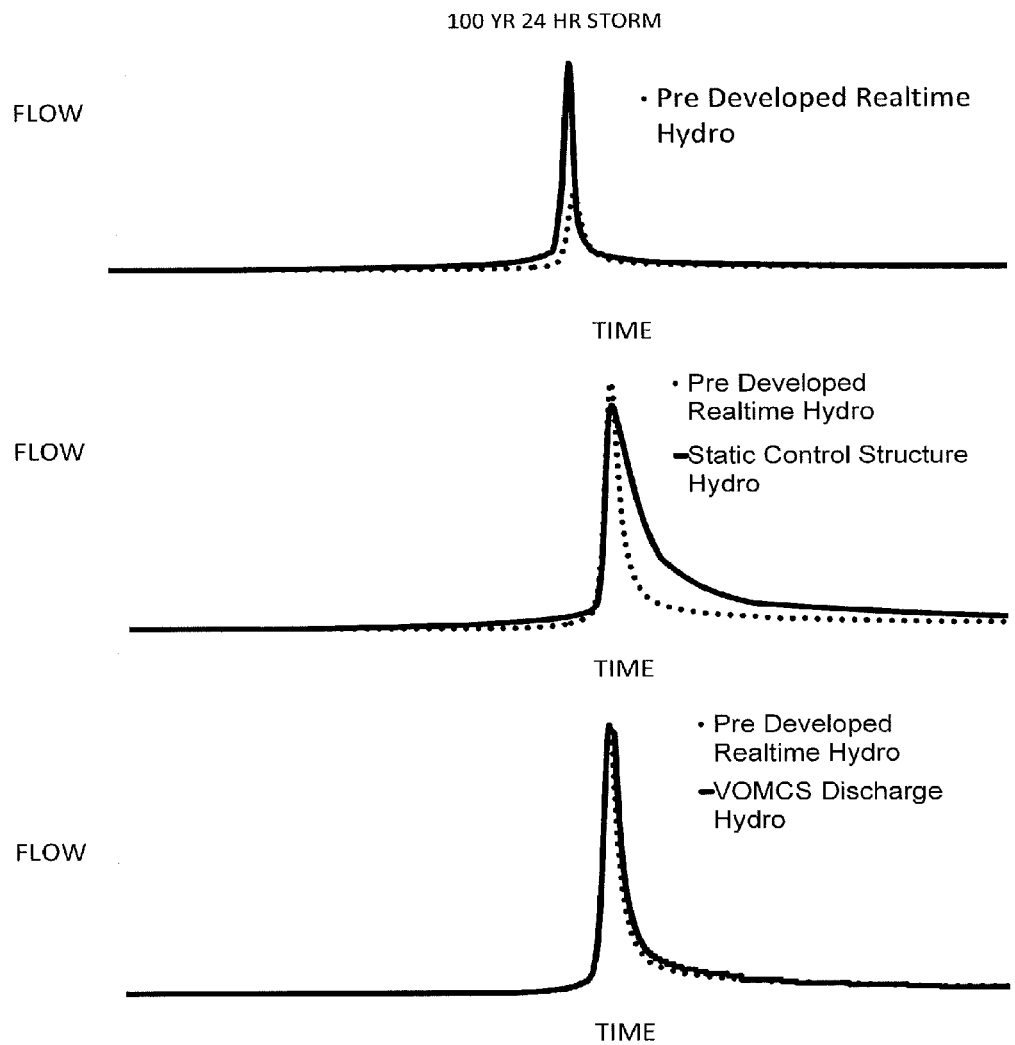
FIG. 11: Modeled results of discharge over time for the same drainage basin as in FIGS. 9 and 10, but for a 100-year storm event. The top frame compares uncontrolled post-developed discharge to pre-developed discharge. The middle frame shows a comparison of post-developed discharge controlled by a static flood control structure to pre-developed discharge. The bottom frame shows a comparison of post-developed discharge controlled according to an embodiment of the flood control method provided in this application to pre-developed discharge.
Figure 12:
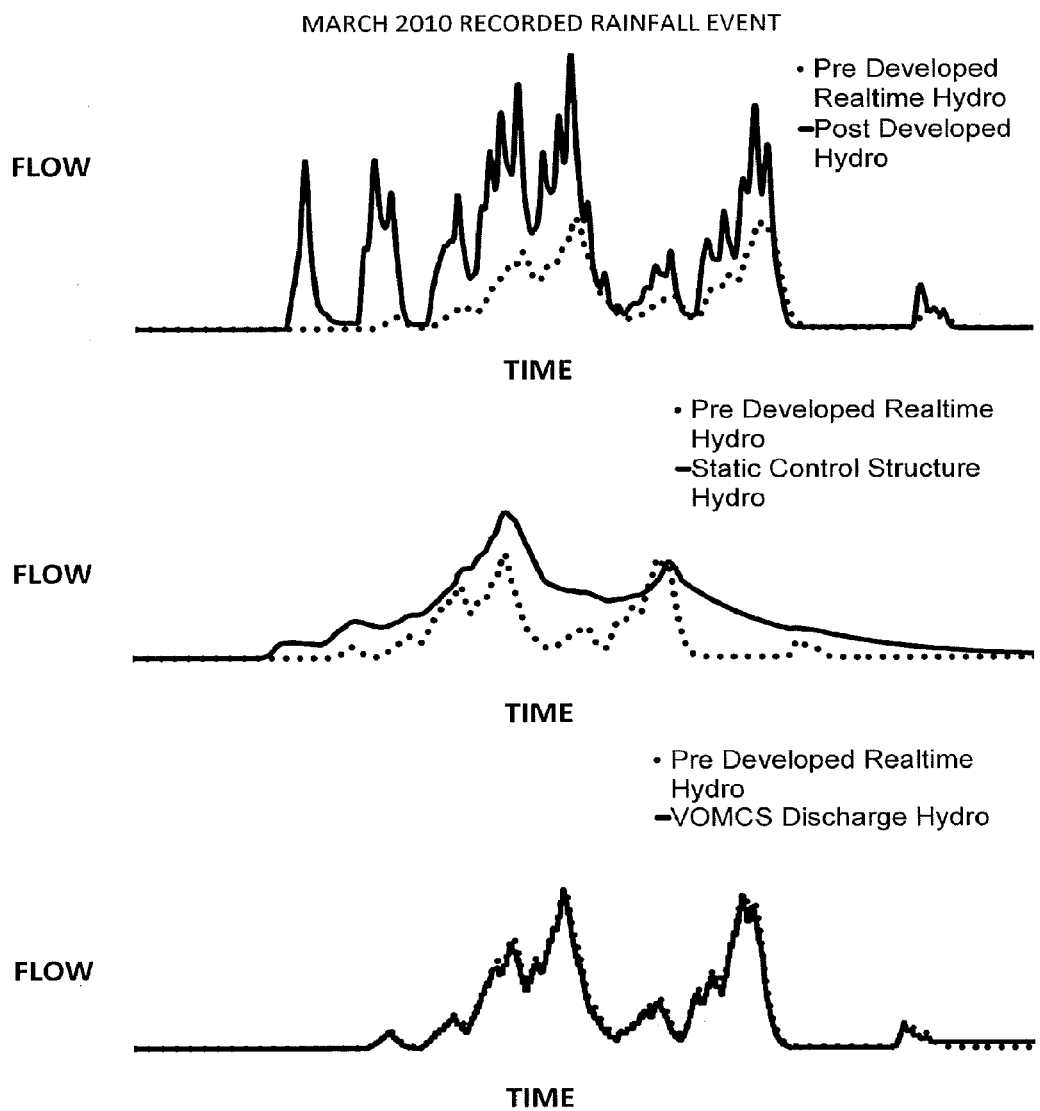
FIG. 12: Modeled results and actual measurements of a historical storm event for the same developed drainage basin as in FIGS. 9-11. The top frame compares uncontrolled post-developed discharge to pre-developed discharge. The middle frame shows a comparison of post-developed discharge controlled by a static flood control structure to pre-developed discharge. The bottom frame shows a comparison of post-developed discharge controlled according to an embodiment of the flood control method provided in this application to pre-developed discharge.

Turning now to the prophetic examples of FIGS. 9-12, the storm flow profiles from a model system are shown for four different flood events. These profiles are from an actual drainage basin. In each figure, the top frame compares uncontrolled post-developed discharge to pre-developed discharge. FIGS. 9-11 show the calculated discharge over time for modeled storm events in the system (two-year, 25-year, and 100-yer storms) and FIG. 12 shows actual results from an actual rainfall event for a pre-development storm event compared to the same rainfall modeled for post-development. As can be seen in all of FIGS. 9-12, uncontrolled post-development discharge is much more intense and occurs over a much shorter period of time than either the pre-development discharge or controlled post-development discharge. The middle frames of FIGS. 9-12 show a comparison of post-developed discharge controlled by a static flood control structure to pre-developed discharge. It should be noted that, although a static control structure provides significantly attenuated discharge when compared to uncontrolled post-development patterns, it significantly differs from pre-development discharge patterns and discharge patterns when the embodiment of the flood control process is used. The bottom frames of FIGS. 9-12 show a comparison of post-developed discharge controlled according to an embodiment of the flood control method provided in this application to pre-developed discharge. Note that the bottom frame of FIG. 11 displays elevated flow during recession period used the embodiment of the process over the pre-development model due to the selection of a function corresponding to a more severe storm. Note also that the elevated flow at the tail-end of the storm in bottom frame of FIG. 12 is due to the process configuring the flow control structure 1000 to provide constant discharge after the end of the storm event so as to reduce the water level in the upstream source body. Apart from the noted deviations, the embodiment of the process closely approximates natural flow in all four examples. Note that all prophetic examples model a static control structure designed not to exceed the pre-developed peak flow rate for any of the two year, 25-year, and 100-year 24 hour design storms. This example demonstrates that static control structures, even when designed for multiple design storms, are not capable of attenuating real storm peak flow rates. It also demonstrates that static control structures can shift the time at which the storm peaks, causing a delay in the peak flow rate, which can lead to downstream flooding.

E. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like. The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. §1.77 or otherwise to provide organizational queues. These headings shall not limit or characterize the invention(s) set forth herein.

I claim:

1. A structure 1000 for controlling liquid flow, the structure comprising:
    (a) a conduit 100 through which the liquid flows;
    (b) a downstream barrier 300 in the conduit 100, the downstream barrier 300 comprising a downstream orifice 310;
    (c) an upstream reconfigurable barrier 200 in the conduit 100, the upstream barrier 200 comprising
        (i) an upstream orifice 210,
        (ii) two retractable sections 220 which, when retracted, increase the width of the upstream orifice 210 to be greater than the width of the downstream orifice 310, and
        (iii) wherein the upstream barrier 200 is capable of assuming a contracted upstream configuration and a retracted upstream configuration;
    (d) a plurality of intermediate reconfigurable barriers 400 in the conduit 100 between the upstream barrier 200 and the downstream barrier 300, each said intermediate barrier 400 comprising
        (i) an intermediate orifice 410
        (ii) two retractable sections 220 which, when retracted, increase the width of the intermediate orifice 410 to be greater than the width of the downstream orifice 310, and
        (iii) wherein each intermediate barrier 400 is capable of assuming a contracted intermediate configuration and a retracted intermediate configuration;
    wherein the size of a given intermediate orifice 410 when the intermediate barrier 400 is in the contracted configuration is smaller than the size of the orifice immediately downstream;
    and wherein the size of a given intermediate orifice 410 is no smaller than the size of the orifice immediately downstream when the intermediate barrier 400 is in the intermediate configuration.

2. A structure 1000 for controlling the flow of a fluid, the structure comprising:
    (a) a fluid conduit 100 through which the fluid flows;
    (b) an upstream reconfigurable barrier 200 in the conduit 100, the upstream barrier 200 comprising an upstream orifice 210, and the upstream barrier 200 capable of assuming a first upstream configuration and a second upstream configuration, wherein the upstream orifice 210 has a lesser upstream $C_dA$ value when the upstream barrier 200 assumes the first upstream configuration, the upstream orifice 210 has a greater upstream $C_dA$ value when the upstream barrier 200 assumes the second upstream configuration, and the lesser upstream $C_dA$ value is smaller than the greater upstream $C_dA$ value;

(c) a downstream barrier 300 in the conduit 100, the downstream barrier 300 comprising a downstream orifice 310, wherein the downstream orifice 310 has a downstream $C_dA$ value, the lesser upstream $C_dA$ value is smaller than the downstream $C_dA$ value, and the greater upstream $C_dA$ value is no smaller than the downstream $C_dA$ value;

wherein the upstream orifice 210 reduces the flow of the fluid more than does the downstream orifice when the upstream barrier 200 assumes the first configuration, and wherein the upstream orifice reduces the flow of the fluid no more than does the downstream orifice 310 when the upstream barrier 200 assumes the second configuration; and wherein $C_d$ is the coefficient of discharge and A is the cross-sectional area of the given orifice.

3. The structure of claim 2, wherein (a) the upstream orifice 210 is a contracted upstream size when the upstream barrier 200 assumes the first upstream configuration;

(b) the upstream orifice 210 is an expanded upstream size when the upstream barrier 200 assumes the second upstream configuration;

(c) the downstream orifice 310 is a downstream orifice size;

(d) the contracted upstream size is smaller than the expanded upstream size;

(e) the contracted upstream size is smaller than the downstream orifice size; and (f) the expanded upstream size is no smaller than the downstream orifice size.

4. The structure of claim 2, wherein the upstream reconfigurable barrier 200 is inserted into the conduit 100 in the first upstream configuration and wherein the upstream reconfigurable barrier 200 is withdrawn from the conduit 100 in the second upstream configuration.

5. The structure of claim 2, comprising:

(a) an intermediate reconfigurable barrier 400 in the conduit 100 between the upstream barrier 200 and the downstream barrier 300, the intermediate barrier 400 comprising an intermediate orifice 410, and the intermediate barrier 400 capable of assuming a first intermediate configuration and a second intermediate configuration;

(b) wherein the intermediate orifice 410 reduces the flow of the fluid more than does the downstream orifice 310 when the intermediate barrier 400 assumes the first intermediate configuration;

(c) wherein the intermediate orifice 410 reduces the flow of the fluid no more than does the downstream orifice 310 when the intermediate barrier 400 assumes the second intermediate configuration; and (d) wherein the upstream orifice 210 reduces the flow of the fluid more than does the intermediate orifice 410 when the upstream barrier 200 assumes the first upstream configuration and the intermediate barrier 400 assumes the first intermediate configuration; and (e) wherein the upstream orifice 210 reduces the flow of the fluid no more than does the intermediate orifice 410 when the upstream barrier 200 assumes the second upstream configuration and the intermediate orifice 410 assumes the first intermediate configuration.

6. The structure of claim 5, wherein (a) the upstream orifice 210 is a contracted upstream size when the upstream barrier 200 assumes the first upstream configuration;

(b) the upstream orifice 210 is an expanded upstream size when the upstream barrier 200 assumes the second upstream configuration;

(c) the downstream orifice 310 is a downstream orifice size;

(d) the intermediate orifice 410 is a contracted intermediate size when the intermediate barrier 400 assumes the first intermediate configuration;

(e) the intermediate orifice 410 is an expanded intermediate size when the intermediate barrier 400 assumes the second intermediate configuration;

(f) the contracted upstream size is smaller than the expanded upstream size;

(g) the contracted intermediate size is smaller than the expanded intermediate size;

(h) the contracted upstream size is smaller than the contracted intermediate size;

(i) the contracted intermediate size is smaller than the downstream orifice size;

(j) the expanded upstream size is no smaller than the downstream orifice size;

(k) the expanded upstream size is no smaller than the contracted intermediate size; and (l) the expanded intermediate size is no smaller than the downstream orifice size.

7. The structure of claim 5, wherein the intermediate reconfigurable barrier 400 is inserted into the conduit 100 in the first intermediate configuration and wherein the intermediate reconfigurable barrier 400 is withdrawn from the conduit 100 in the second intermediate configuration.

8. The structure of claim 5, wherein:

(a) the intermediate orifice 410 has a lesser intermediate $C_dA$ value when the intermediate barrier 400 assumes the first intermediate configuration;

(b) the intermediate orifice 410 has a greater intermediate $C_dA$ value when the intermediate barrier 400 assumes the second intermediate configuration;

(c) the lesser intermediate $C_dA$ value is smaller than the greater intermediate $C_dA$ value;

(d) the lesser upstream $C_dA$ value is smaller than the lesser intermediate $C_dA$ value;

(e) the lesser intermediate $C_dA$ value is smaller than the downstream $C_dA$ value;

(f) the greater upstream $C_dA$ value is no smaller than the lesser intermediate $C_dA$ value; and (g) the greater intermediate $C_dA$ value is no smaller than the downstream $C_dA$ value.

9. The structure of claim 2, comprising a series 500 of reconfigurable intermediate barriers 400 between the upstream and downstream barriers 300 each comprising an intermediate orifice 410, each of the intermediate barriers 400 having a first intermediate configuration and a second intermediate configuration, wherein a given intermediate orifice 410 reduces the flow of the fluid more than does the orifice immediately downstream when the given intermediate barrier 400 assumes the first intermediate configuration, and wherein the given intermediate orifice 410 reduces the flow of the fluid no more than does the orifice immediately downstream when the given intermediate barrier 400 assumes the second configuration.

10. The structure of claim 9, wherein:
(a) each intermediate orifice 410 is a contracted intermediate size when the intermediate barrier 400 assumes the first intermediate configuration;
(b) each intermediate orifice 410 is an expanded intermediate size when the intermediate barrier 400 assumes the second intermediate configuration;
(c) the contracted intermediate size of a given intermediate orifice 410 is smaller than the size of the orifice immediately downstream; and
(d) the expanded intermediate size of the given intermediate orifice 410 is no smaller than the size of the orifice immediately downstream;
wherein in the downstream orifice 310 has a downstream orifice 310 size, and wherein the expanded size of each intermediate orifice 410 is no smaller than the downstream orifice 310 size.

11. The structure of claim 9, wherein:
(a) each intermediate orifice 410 is inserted into the conduit 100 when the intermediate barrier 400 assumes the first intermediate configuration; and
(b) each intermediate orifice 410 is withdrawn from the conduit 100 when the intermediate barrier 400 assumes the second intermediate configuration.

12. The structure of claim 9, wherein:
(a) each given intermediate orifice 410 has a lesser intermediate $C_dA$ value when the given intermediate barrier 400 assumes the first intermediate configuration;
(b) each given intermediate orifice 410 has a greater intermediate $C_dA$ value when the given intermediate barrier 400 assumes the second intermediate configuration;
(c) the lesser intermediate $C_dA$ value is smaller than the greater intermediate $C_dA$ value;
(d) the lesser intermediate $C_dA$ value is smaller than the $C_dA$ value of the orifice immediately downstream; and
(e) the greater intermediate $C_dA$ value is no smaller than the $C_dA$ value of the orifice immediately downstream.

13. The structure of claim 12, wherein:
(a) the lesser intermediate $C_dA$ value is smaller than the downstream $C_dA$ value; and
(b) the greater intermediate $C_dA$ value is no smaller than the downstream $C_dA$ value.

14. The structure of claim 2, wherein
(a) the upstream orifice 210 is a contracted upstream size when the upstream barrier 200 assumes the first upstream configuration;
(b) the upstream orifice 210 is an expanded upstream size when the upstream barrier 200 assumes the second upstream configuration;
(c) the upstream orifice 210 is maximally contracted in the first upstream configuration; and
(d) the upstream orifice 210 is maximally expanded it the second upstream configuration.

15. The structure of claim 2, wherein the upstream reconfigurable barrier 200 comprises a plurality of retractable sections 220.

16. A flood control system 3000 for providing a predetermined volumetric discharge pattern in response to a storm event, the system comprising:
(a) the flow control structure 1000 of claim 2;
(b) a computing device 1100 in control of the flow control structure 1000 by controlling the configuration of the upstream reconfigurable barrier;
(c) a water level meter 1200 positioned to measure the water level at the intake point and configured to transmit water level data to the computing device 1100;
(d) a rain gauge 1300 configured to transmit rainfall data to the computing device 1100;
(e) and a machine-readable data storage device 1400 comprising a plurality of storm flow functions that each set a rate of volumetric discharge as a function of rainfall rate,
wherein the machine-readable data storage device 1400 is configured to be read by the computing device 1100.

17. A structure 1000 for controlling the flow of a fluid, the structure comprising:
(a) a fluid conduit 100 through which the fluid flows;
(b) an upstream reconfigurable barrier 200 in the conduit 100, the upstream barrier 200 comprising an upstream orifice 210, and the upstream barrier 200 capable of assuming a first upstream configuration and a second upstream configuration;
(c) a downstream barrier 300 in the conduit 100, the downstream barrier 300 comprising a downstream orifice 310;
wherein the upstream orifice 210 reduces the flow of the fluid more than does the downstream orifice when the upstream barrier 200 assumes the first configuration, and
wherein the upstream orifice reduces the flow of the fluid no more than does the downstream orifice 310 when the upstream barrier 200 assumes the second configuration; and
wherein the upstream reconfigurable barrier 200 comprises two retractable sections 220 which, when retracted, increase the size of the orifice to be greater than the width of the downstream orifice 310.

18. The structure of claim 17, wherein the two retractable sections 220 are retracted at least partially from the conduit 100 in the second upstream configuration and are fully extended into the conduit 100 in the first upstream configuration.

19. The structure of claim 17, wherein:
(a) two retractable sections 220 are retracted at least partially from the conduit 100 in the second upstream configuration and are fully extended into the conduit 100 in the first upstream configuration; and
(b) each of the two retractable sections 220 defines a portion of the perimeter of the upstream orifice 210.

* * * * *